April 29, 1969     B. L. HALLENBECK     3,441,852
ELECTROSTATICALLY SHIELDED INDICATOR Filed May 21, 1965

B.L. HALLENBECK
INVENTOR.

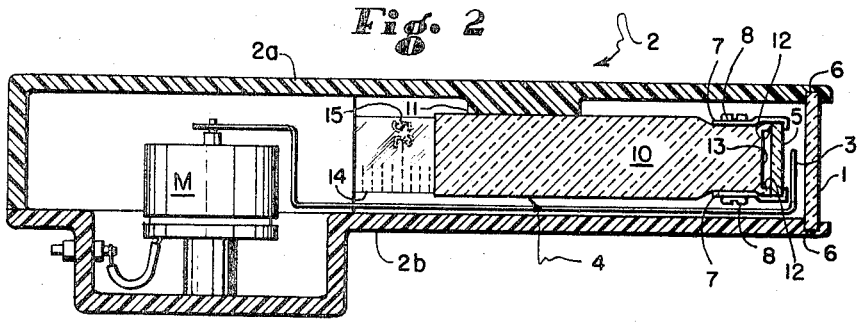
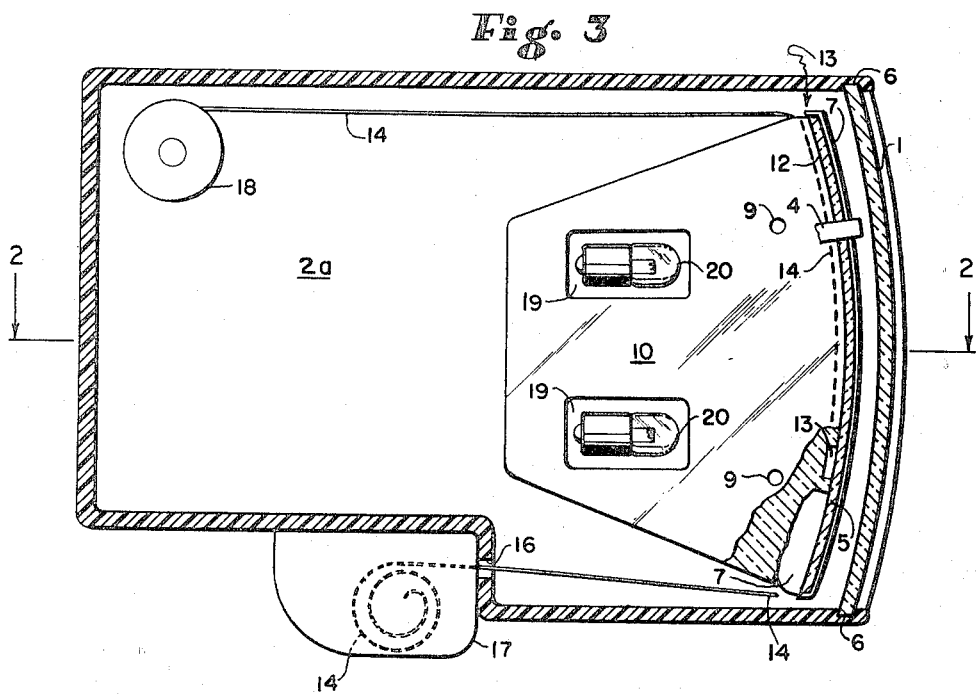
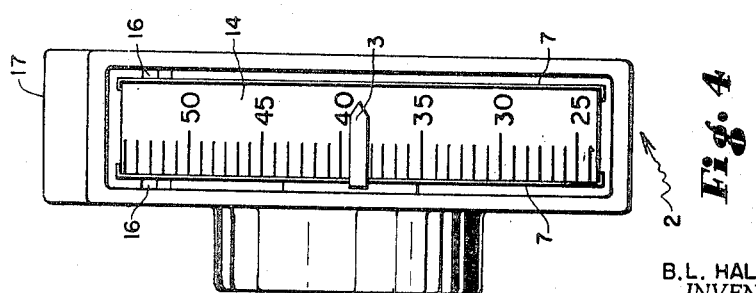

United States Patent Office 3,441,852
Patented Apr. 29, 1969

3,441,852
ELECTROSTATICALLY SHIELDED INDICATOR
Bennett L. Hallenbeck, Ogden, N.Y., assignor to Sybron Corporation, Rochester, N.Y., a corporation of New York
Filed May 21, 1965, Ser. No. 457,688
Int. Cl. G01r 1/04, 1/18; H05k 5/00
U.S. Cl. 324—156     20 Claims

ABSTRACT OF THE DISCLOSURE

An electrical meter has its pointer shielded by a unipotential element enveloping the pointer. For example, the pointer moves along the space between two parallel, space strips of electrically conductive glass, one strip being the meter cover glass, the other lying over the meter scale between the pointer and scale. The strips are electrically connected together.

---

This invention relates to prevention of electrostatic interference with pointer position and/or movement in indicating instruments.

The general object of the invention is to provide indicating instruments and the like with means preventing electrostatic interference with pointer position and/or movement.

Other objects of the invention will be evident from the written description and claims incorporated herein.

FIGURES 2 and 3 are internal views of an instrument according to the invention, FIGURE 2 being a partial section on the plane 2—2 of FIGURE 3.

FIGURE 4 is a frontal elevation of the instrument shown in FIGURES 2 and 3.

Figure 1:
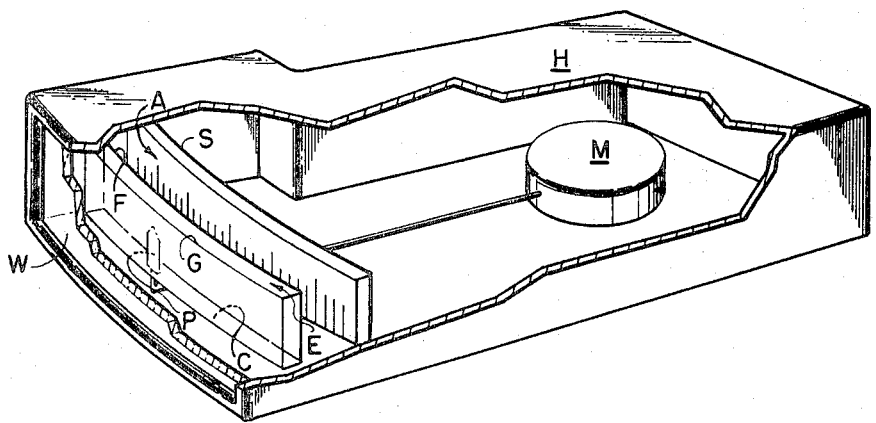
FIGURE 1 is a perspective view, partly broken away, illustrating the basic principles of the invention.

FIGURE 1 shows an instrument according to the invention having a casing H, one end of which is closed by the transparent glass or plastic window W. Inside the housing is a pointer P and a mechanism M for moving the pointer P along a scale A on a scale bearing member S, which, like mechanism M, is supported by housing H. It is to be supposed that the mechanism M is responsive to one or another variable condition such as to move the pointer P to positions along scale A, the arrangement being that one may look through window W, and read the position of the pointer relative to scale A, and interpret such position as the value of the condition.

The foregoing describes any of a countless number of meters, gauges, indicators and so on, known in the art. Among these, there are those which, for various reasons, are adversely affected by unwanted electrostatic forces acting on the structure within housing H. Thus, this structure may be quite delicate or quite sensitive to mechanical stresses acting thereon, the deflecting force the mechanism M can provide may be quite small, and so on, and to the extent that the position of pointer P relative to scale A is appreciably affected by forces due to electrostatic fields, such as may exist, for example, because of a potential difference between pointer P and member S, or between pointer P and window W, etc.

According to the invention, I provide the unipotential element E, in essence, an electrically conductive (in the DC sense) surface, substantially enveloping the pointer P and the path that mechanism M is intended to move the pointer along. As the pointer is in the main a linear entity, i.e., its dimensions, except for the length thereof, are more or less negligible, the major portion of the element E is taken up by the striplike parts G and F thereof interposed between window W and the pointer P, and the member S and the pointer respectively.

As will be seen from FIGURE 1, the striplike elements G and F are substantially coextensive with and parallel to the path that the pointer P can traverse for a full scale deflection thereof along scale A. Transverse to their length, the striplike parts F and G will be dimensioned to cover as much of the pointer as is needed to prevent electrostatic forces from affecting the position of the pointer. As shown, the vertically positioned part of the pointer is the only portion thereof between the parts F and G. Obviously, the parts F and G could extend along the horizontal part of the pointer P, also.

The element E provides a region between parts F and G wherein the electrostatic potential is everywhere the same. Therefore, irrespective of the electrostatic potential of element E, it will exert no net force in any direction on that part of pointer P within the said region. Furthermore, if a body of electrical charge is adjacent the element E, and causes a change in the potential thereof, the conductivity of element E will distribute the electrical charge, thus added to or taken from the element, uniformly over the surfaces of the element. Hence, the potential in said region, even if it changes, will be the same everywhere therein, and therefore will have no net effect on the pointer P.

Tht foregoing implies that the element E totally encloses the aforesaid region. Obviously, as the pointer P must extend through a boundary of said region, say, at the bottom boundary thereof, indicated at C in FIGURE 1, element E would be open at this boundary along the length of the path of the pointer. Actually, in practice, it is found that the parts F and G suffice to provide the desired region and do not even have to be electrically conductively connected together and/or to anything else. In other words, parts F and G need be nothing more than a pair of conductive, parallel, spaced plates, isolated from each other in the DC sense.

Since the scale A is intended to be viewed through parts F and G, they must be sufficiently translucent to the extent that the position of pointer P relative to scale A can be directly observed by the human eye.

In practice, in order to provide element E in more or less transparent form, parts F and G may be provided in the form of a pair of strips of conductively coated clear glass or plastic, or even a pair of strips of metallic screening capable of transmitting enough light through the mesh thereof to enable pointer position to be read, such as 180 mesh stainless steel screen.

In FIGURE 2, which illustrates an actual example, as applied to an instrument that is basically a milliammeter, part G is to be supposed to be a conductive surface of a glass plate 1 forming a window of a casing 2. Thus, the plate 1 will have had its left side (i.e., that next adjacent the vertical part 3 of a pointer 4) treated with stannous oxide, or the like, according to known practices, whereby a highly transparent conductive surface layer is formed, due to some sort of chemical combination between glass at its surface and the material with which that surface is treated. As a result of such treatment, the said surface typically has a resistivity of 50,000 ohms per "square," but to the naked eye is hardly distinguishable from its untreated state. In practice, the magnitude of the resistance of the coating, metal screen, or the like, is immaterial, for the element E, or such portion thereof as is used, is only required to be such that electrical charge thereon will remain evenly distributed over its effective surfaces, despite additions thereto or subtractions therefrom.

Part F, on the other hand, is provided in the form of a conductive surface of a glass plate 5, the right side thereof (i.e., the side next adjacent pointer part 3) having been treated with stannous oxide, or the like, as in the case of the left side of plate 1.

Plate 1 is supported at what is the front end of casing 2 by means of suitable grooving 6. Plate 5 is held between a pair of arculate clamps 7, held by means of screws 8 screwed into holes 9 of a transparent member 10. Member 10 is in effect a stationary part of casing 2, and is affixed thereto by any suitable means, not shown, but symbolized by the pedestal-like entity 11 projecting from the casing 2 and abutting member 10.

Member 10 is provided with a pair of curved flanges 12 running parallel to one another and to the length of plate 5, which has the same curvature as the flanges, clamps 7 also having the curvature of the flanges and holding the plate 5 against the flanges so as to define a channel 13 bounded by the left side of plate 5, the inside of the flanges and the surface of member 10 between the flanges, and which has the curvature of the flanges 12.

The channel 13 receives a tape 14, having indicia thereon, as indicated at 15, FIGURE 2. One end of the tape 14 passes through a slot 16 in casing 2 and thence into a cartridge 17, whereas the other end of tape 14 passes onto a spool 18, mounted within the casing 2. The disposition of the tape 14 is best seen in FIGURE 3, which represents a view into the major part 2a of casing 2, with the lower part 2b, serving more or less as a cover for part 2a, removed. The dashed line continuation of tape 14 also delineates the surface of channel 13 between the flange 12. Also, in FIGURE 3, the corner of member 10 and the corresponding part of tape 14 has been broken away, and the clamp 6 that would otherwise be nearest to view has been omitted.

The purpose of the tape 14 is to provide for a scale of indicia much larger or more varied than could be provided by a scale plate having just the angular extent of the possible deflection of pointer 4 inside casing 2. Hence, suitable mechanism (not shown) will be provided for transferring tape between cartridge 17 and spool 18, so that any desired section of tape 14 can be exposed to view. Thus, if the instrument be supposed to be an ammeter with a total range of 0 to 5 milliamperes DC, whereas this range of current may correspond to, say, 25° F. range of temperature variation in some entity (not shown), with respect to some arbitrary value of temperature, which differs from case to case, then the scale of indicia on tape 14 may extend over a range much larger than 25° F., but with 25° F. intervales having just the angular extent of the maximum deflection of pointer 4. Thus, if the tape 14 is adjusted so that the center value of the range of temperature variation is at the 3 ma. position of pointer 4, i.e., half-way across the front face of member 10, then the reading of pointer part 4 on the scale will be of the actual temperature, rather than of the variation alone of said temperature.

Tape 14 is therefore required to be flexible, and this is conveniently accomplished by making it of some strong plastic-like Mylar, especially if illumination be desired. Thus, a pair of depressions 19 in member 10 may receive electric light bulbs 20, powered by any suitable means (not shown). Accordingly, by providing that either the indicia on the tape or the tape itself, be translucent, and the other thereof opaque, or therwise providing optical contrast that will show up by light transmitted through the tape, the position of pointer part 3 (which would be opaque, or otherwise optically contrasting) can be read through plate 1 and plate 5 by means of the light from bulbs 20. The illumination, while not a critical feature of the invention, is of some particular import here for the reason that the surface coatings on plates 1 and 5 does cut down transmission of light, in spite of the fact that the presence of the coating is not readily discernible to the naked eye. However, independently of the loss of transmission due to coatings, illumination is desirable since environmental lighting conditions are often unsatisfactory insofar as reading the instrument is concerned.

Be that as it may, moving the plastic tape over the plastic member 10 is prone to electrify the tape in the classic fashion, for the tape 14 rubs against member 10. Were the pointer part 3, unprotected, to travel closely adjacent the tape, the force on the pointer 3 due to the electrified tape would affect the pointer's position, by as much as several percent of the total range of pointer movement in a milliammeter of the sort envisaied above, which is several times the amount of error that can normally be tolerated.

However, it appears that the plate 5, or rather the conductive coating thereon, substantially totally eliminates this error due to electrostatic forces originating in structure on the other side of plate 5 from pointer part 3. That is to say, the effect of the said coating is that, regardless of the state of electrification of tape 14, the position of pointer 4 remains substantially unaffected thereby.

It will be observed that plate 1 provides the functions of both window W and the conductive surface corresponding to part G, FIGURE 1. Often the window W will be rubbed with a cloth, or the like, to clean it, thereby electrifying it more or less, and influencing the position of pointer part 3, unless a conductive surface intervenes, as in the present case.

While FIGURES 2, 3 and 4 are roughly to scale, the illustrated material thicknesses, shapes and spacings have been chosen mainly with an eye to ease, clarity and simplicity of illustration and explanation. For example, plate 5 is several times the thickness of its counterpart in the production form of the illustrated instrument.

Also, such materials as have been referred to, and the disclosed uses of the instrument are purely exemplary, and are not intended to be limiting. Thus, while the invention is a particularly apt solution for the electrostatic force problem arising from the use of the movable plastic tape 14, the said solution will apply in general to electrostatic force problems arising, by whatever means, in the structure adjacent the pointer 4.

I claim:

1. In an instrument having a pointer movable past adjacent scale-bearing structure of said instrument and along a fixed path corresponding to a scale on said structure, said pointer being movable by forces exerted thereon when said structure is at electrostatic potential differing from that of said pointer; and including mechanism coupled to said pointer for moving said pointer past said structure in response to a condition and to positions relative to said scale, that are representative of said condition, said instrument being so constructed and arranged that if said forces arise, said positions would reflect the effect of said forces as well as the effect of said condition; the improvement comprising a unipotential element extending along said fixed path and lying between said fixed path and said structure, said pointer having a portion influenceable by electric charge on said structure, and said element having sufficient area between said structure and said pointer to shield said portion from said charge.

2. The invention of claim 1, wherein said element is translucent enough to permit visual observation of said pointer's position relative to said scale.

3. The invention of claim 1, wherein said element comprises an electrically conductive striplike part lying along said path.

4. The invention of claim 1, wherein said element comprises an electrically conductive striplike part, said part being translucent enough to permit visual observation of said pointer's position relative to said scale and lying along said path.

5. The invention of claim 1, wherein said element comprises a substantially transparent glass plate, said plate having an electrically conductive, substantially transparent surface coating thereon, said coating lying along said path.

6. In an instrument having a pointer movable past adjacent scale-bearing structure of said instrument and along a fixed path corresponding to a scale on said structure, said pointer being movable by forces exerted thereon when said structure is at electrostatic potential differing from that of said pointer; and including mechanism coupled to said pointer for moving said pointer past said structure in response to a condition and to positions relative to said scale, that are representative of said condition, said instrument being so constructed and arranged that if said forces arise, said positions would reflect the effect of said forces as well as the effect of said condition; the improvement comprising a unipotential element extending along and substantially enveloping said fixed path and said pointer, excluding said structure, said pointer having a portion influenceable by electric charge on said structure, and said element having sufficient area between said structure and said pointer to shield said portion from said charge.

7. The invention of claim 6, wherein said element is translucent enough to permit visual observation of said pointer's position relative to said scale.

8. The invention of claim 6, wherein said element comprises a pair of electrically conductive striplike parts lying along each other and said path, with said path lying therebetween.

9. The invention of claim 6, wherein said element comprises a pair of electrically conductive striplike parts, said parts being translucent enough to permit visual observation of said pointer's position relative to said scale, and said parts lying along each other and said path, with said path lying therebetween.

10. The invention of claim 6, wherein said element comprises a pair of substantially transparent glass plates, said plates each having an electrically conductive, substantially transparent coating thereon, the coatings on said plates lying along each other and said path, with said path lying therebetween.

11. In an instrument having a pointer movable past adjacent scale-bearing structure of said instrument and along a fixed path corresponding to a scale on said structure, said scale being provided on a dielectric member forming part of said structure and being in movable frictional engagement with a portion of said structure; said pointer being movable by electrostatic forces arising if said dielectric member is moved while engaging said portion, said structure having means for moving said dielectric member along said path while the latter remains in frictional engagement with said portion; and including mechanism coupled to said pointer for moving said pointer past said dielectric member in response to a condition and to positions relative to said scale, that are representative of said condition, said instrument being so constructed and arranged that if said electrostatic forces arise, said positions would reflect the effect of said electrostatic forces as well as the effect of said condition; the improvement comprising a unipotential element extending along said fixed path and lying between said fixed path and said dielectric member.

12. The invention of claim 11, wherein said element is translucent enough to permit visual observation of said pointer's position relative to said scale.

13. The invention of claim 11, wherein said element comprises an electrically conductive striplike part lying along said path.

14. The invention of claim 11, wherein said element comprises an electrically conductive striplike part, said part being translucent enough to permit visual observation of said pointer's position relative to said scale and lying along said path.

15. The invention of claim 11, wherein said element comprises a substantially transparent glass plate, said plate having an electrically conductive, substantially transparent surface coating thereon, said coating lying along said path.

16. In an instrument having a pointer movable past adjacent scale-bearing structure of said instrument and along a fixed path corresponding to a scale on said structure, said scale being provided on a dielectric member forming part of said structure and being in movable frictional engagement with a portion of said structure; said pointer being movable by electrostatic forces arising if said dielectric member is moved while engaging said portion, said structure having means for moving said dielectric member along said path while the latter remains in frictional engagement with said portion; and including mechanism coupled to said pointer for moving said pointer past said dielectric member in response to a condition and to positions relative to said scale, that are representative of said condition, said instrument being so constructed and arranged that if said electrostatic forces arise, said positions would reflect the effect of said electrostatic forces as well as the effect of said condition; the improvement comprising a unipotential element extending along and substantially enveloping said fixed path and said pointer, and said dielectric member lying outside the region enveloped by said element.

17. The invention of claim 16, wherein said element is translucent enough to permit visual observation of said pointer's position relative to said scale.

18. The invention of claim 16, wherein said element comprises a pair of electrically conductive striplike parts lying along each other and said path, with said path lying therebetween.

19. The invention of claim 16, wherein said element comprises a pair of electrically conductive striplike parts, said parts being translucent enough to permit visual observation of said pointer's position relative to said scale, and said parts lying along each other and said path, with said path lying therebetween.

20. The invention of claim 16, wherein said element comprises a pair of substantially transparent, electrically conductive plates, said plates each having an electrically conductive, substantially transparent surface coating thereon, the coatings on said plates lying along each other and said path, with said path lying therebetween.

References Cited

UNITED STATES PATENTS 2,888,671   5/1959   Bolie _____ 324—109

OTHER REFERENCES

Electrical Indicating Panel Meters and Pyrometers, Assembly Products, Inc., Bulletin G–9, February 1955, p. 3.

"Shock Protection for Instrument Windows," Electrical Manufacturing, A. D. Bedrosian, August 1954, pp. 102–105.

RUDOLPH V. ROLINEC, *Primary Examiner.*

ALFRED E. SMITH, *Assistant Examiner.*

U.S. Cl. X.R.

174—35; 324—76